UNITED STATES PATENT OFFICE.

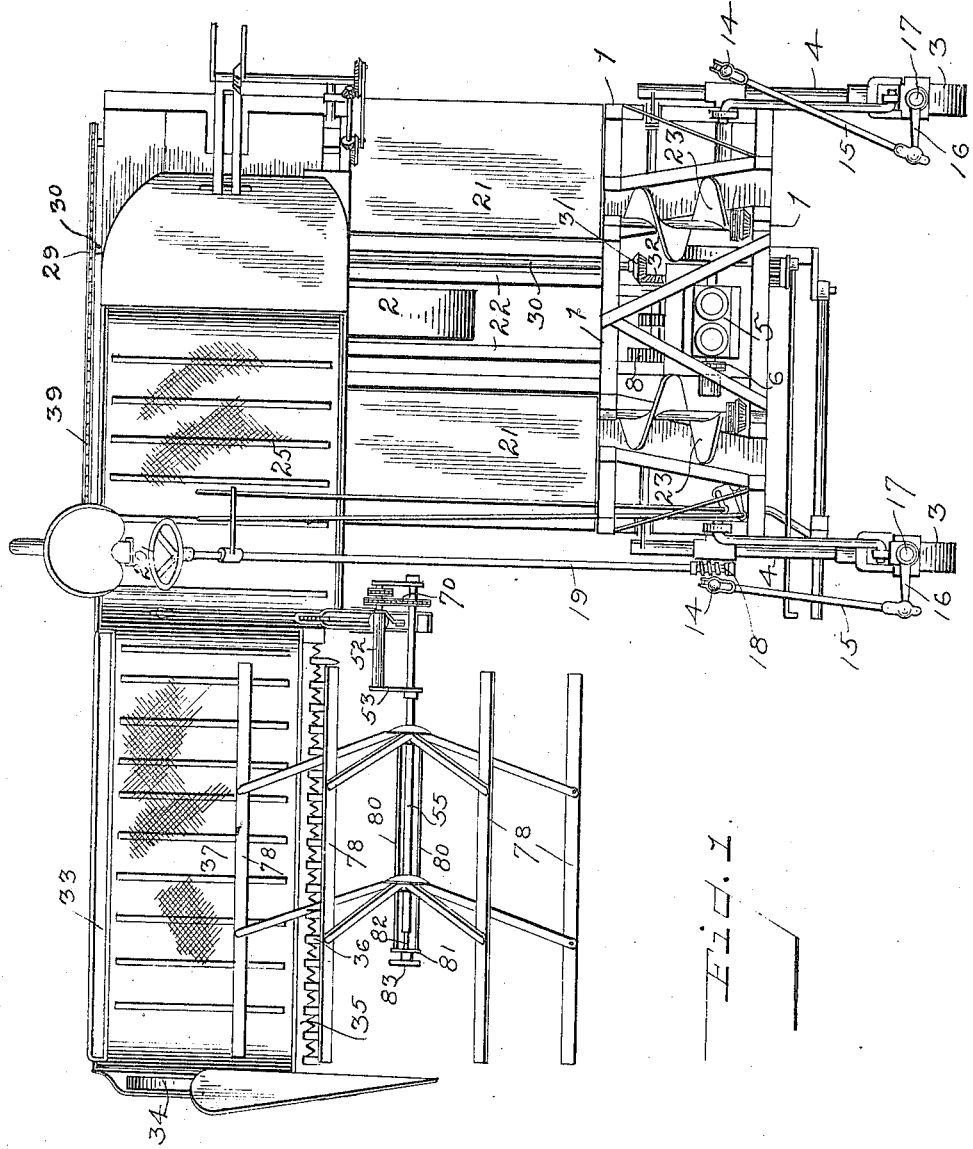

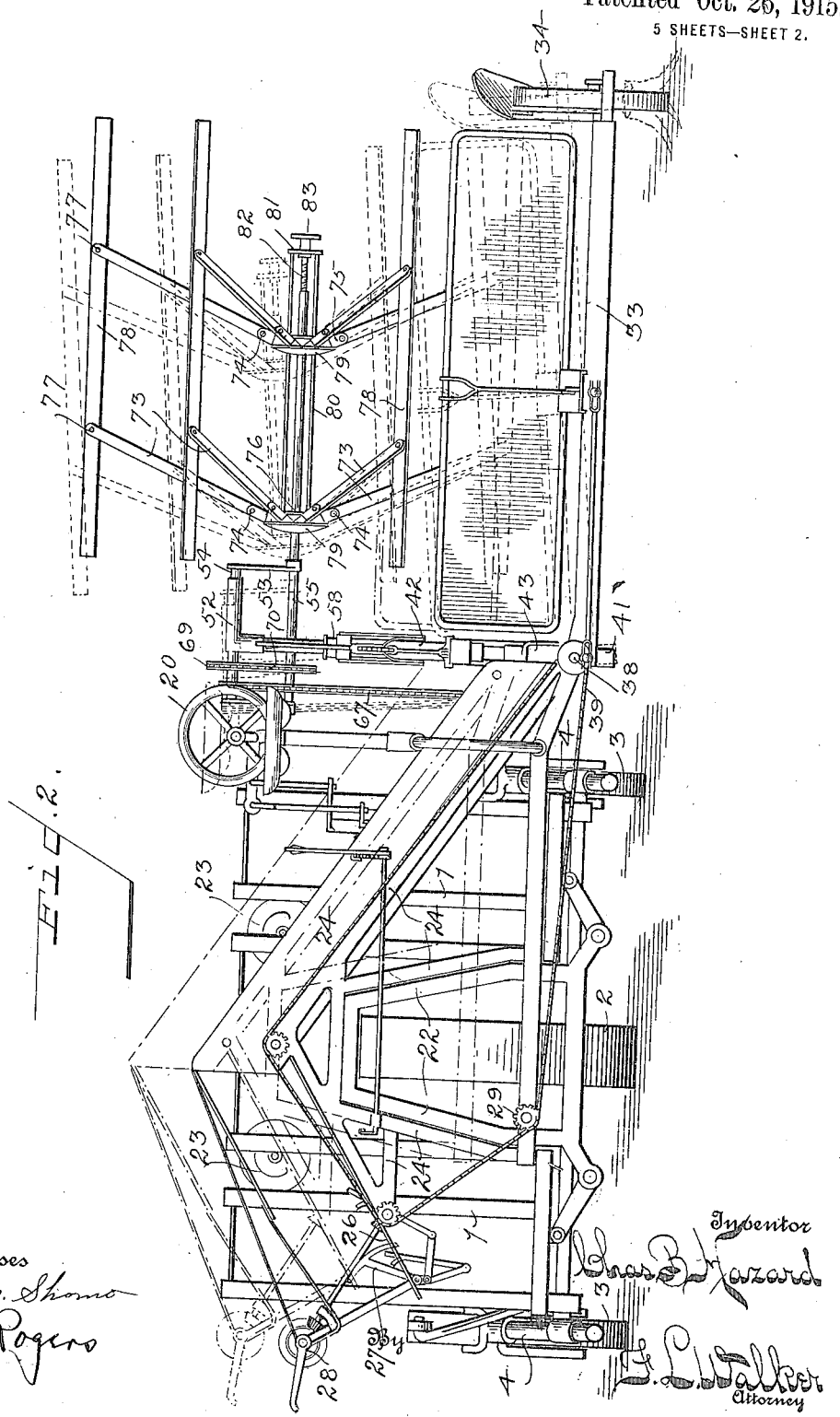

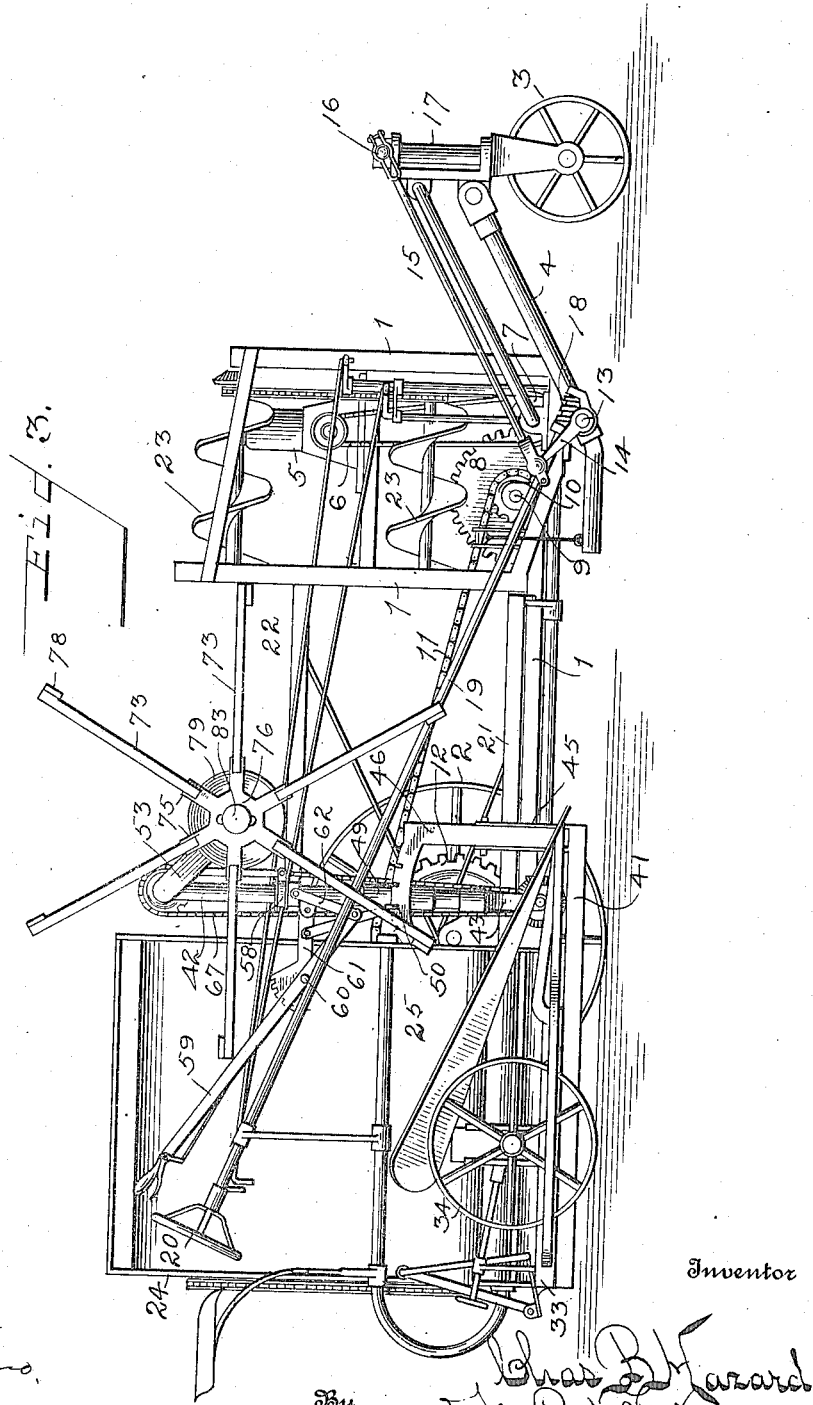

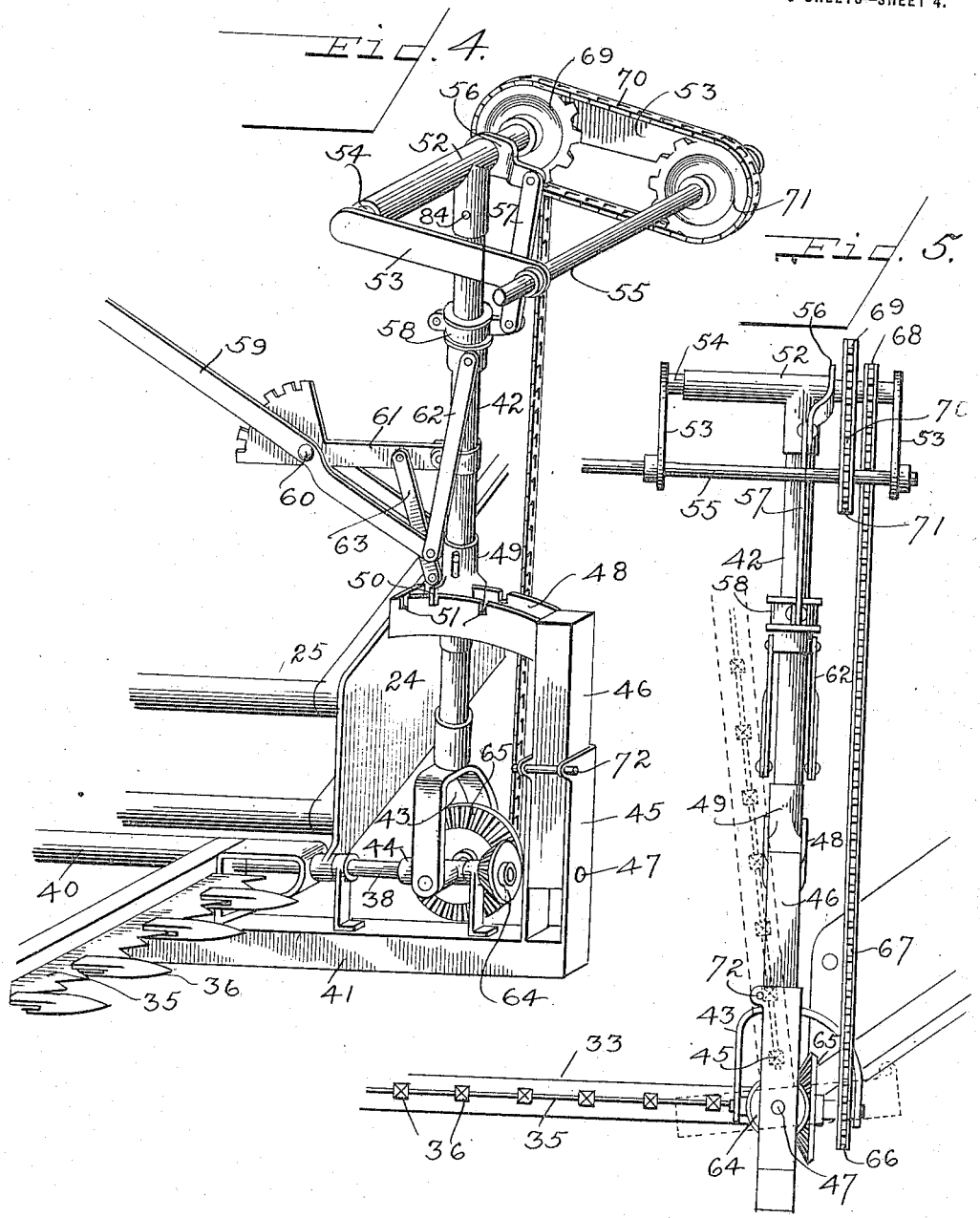

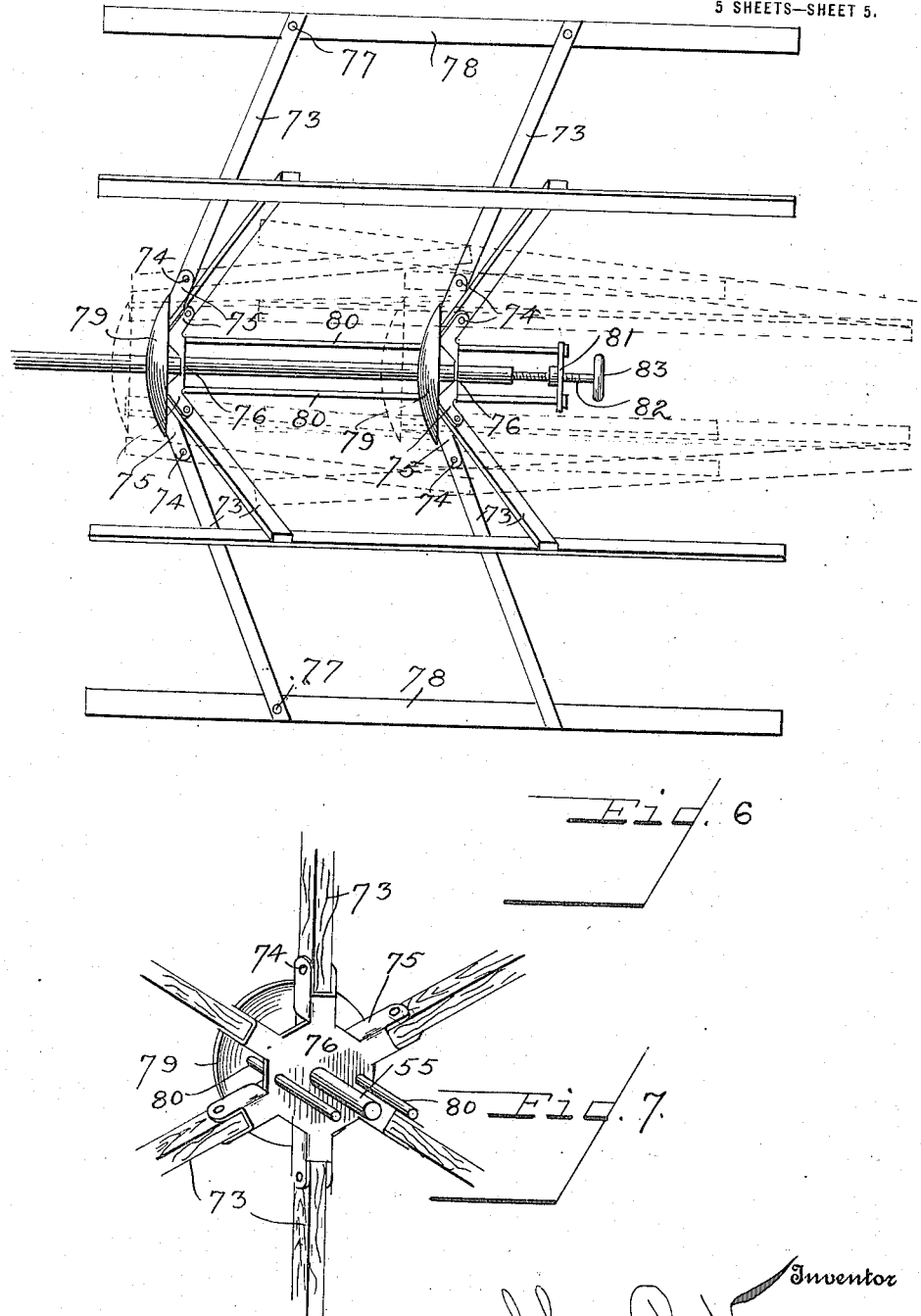

CHARLES B. HAZARD, OF NEAR XENIA, OHIO.

HARVESTING-MACHINE.

1,158,050.  Specification of Letters Patent.  Patented Oct. 26, 1915.

Application filed July 10, 1912. Serial No. 708,703.

*To all whom it may concern:*

Be it known that I, CHARLES B. HAZARD, a citizen of the United States, residing near Xenia, in the county of Greene and State of Ohio, have invented certain new and useful Improvements in Harvesting-Machines, of which the following is a specification.

My invention relates to harvesting machines and particularly to a combination harvester of the tractor type and is a further development of the construction set forth and described in my co-pending applications for Letters Patent, Serial No. 501,811, filed June 12, 1909, and Serial No. 615,049, filed March 17, 1911.

The invention relates more especially to a grain binder attachment adapted to be employed in combination with a tractor or motor driven truck forming a part of the harvesting machine referred to in the aforementioned applications.

The object of the invention is to simplify the structure as well as the means and mode of operation of harvesting machines whereby they will not only be cheapened in construction but will be more efficient in use, easily operated, readily adapted for harvesting growths of different character and unlikely to get out of repair.

A further object of the invention is to provide a grain binding attachment suitable for use with a tractor or carrying truck of general application and to provide in such attachment a yielding platform capable of adjustment independent of the tractor or carrying truck and the main portion of the binder attachment to compensate for inequalities in the ground.

A further object of the invention is to provide an improved form of folding reel adapted to maintain constant relation with the platform and cutter bar throughout their varying positions and adjustment, and to provide improved means for adjusting the reel in its relation to other portions of the machine.

With the above primary and other incidental objects in view as will more fully appear in the specification, the invention consists of the features of construction, the parts and combinations thereof, the mode of operation, or their equivalents as hereinafter described and set forth in the claims.

In the drawings, Figure 1 is a plan view of the assembled machine. Fig. 2 is a rear elevation of the assembled machine, showing by dotted lines the relative movement of the platform and reel in surmounting an obstruction. In this figure the removal portions of the structure comprising the binder attachment is indicated by dot and dash lines as partially removed from the truck or tractor. Fig. 3 is a side elevation of the assembled machine. Fig. 4 is a perspective view of the adjustable reel post and the driving connections for the reel. Fig. 5 is a front elevation of the reel post showing by dotted lines the platform in its elevated position ready for transportation of the machine. Fig. 6 is a side elevation of the reel in extended position while by dotted lines is shown the folded position of the reel parts. Fig. 7 is a detail of the supporting connection for the reel arms.

Like parts are indicated by similar characters of reference throughout the several views.

The binding machine features forming the subject matter of the present invention are adapted to be employed in conjunction with the main carrying truck or tractor shown and described as a part of the corn harvester which forms the subject matter of the aforementioned pending applications.

One of the primary objects of the invention is to obviate the necessity of an entirely separate and distinct machine for each character of operation but to the contrary to enable one main truck or tractor to be employed for sundry purposes.

While the machine forming the subject matter hereof is shown and described as embodying a motor operated truck forming a farm tractor of general utility it is to be understood that the machine may be drawn by horses or propelled by other means and the several operating parts may be driven from the carrying wheels in the usual manner.

The main truck or tractor common to the present constructions and to those shown and described in the aforementioned pending applications comprises a main frame 1 preferably, though not necessarily, formed of angle irons and supported on three carrying wheels. Centrally located in the rear portion of the truck or tractor is a main carrying wheel 2, while two swiveled outrider wheels 3 are located adjacent to the forward portion of the machine. The swiveled outrider wheels 3 are carried upon adjustable arms 4, the oscillation of which causes a raising or lowering movement of the main frame 1. The means and mechanism for oscillating the arms 4 to adjust the frame are fully described in the aforementioned co-pending applications and inasmuch as they form no part of the present invention will not be further described herein. The swivel wheels 3 are carrying wheels only while the main wheel 2 is the drive wheel operated by a gasolene or other form of motor 5 carried upon the forward portion of the truck or tractor. This motor not only propels the machine but also actuates the several moving parts thereof. The motor 5 is connected by a sprocket chain 6 with a sprocket wheel 7 located on a transverse counter shaft in the lower part of the main frame 1 which counter shaft carries a gear pinion meshing with the gear 8 located on the transverse drive shaft 9. The transverse drive shaft 9 carries a sprocket 10 engaging the drive chain 11 which in turn engages the sprocket wheel 12 carried by the main carrying wheel 2. Located beneath the main frame 1 is a transverse rock shaft 13 carrying at each end the rock arms 14 which are connected by links 15 to corresponding rock arms 16 upon the vertical shaft 17 of the swivel wheels 3. The transverse rock shaft 13 also carries a worm gear engaged by a worm gear 18 located on the extremity of a revoluble shaft 19 extending rearward and upward and carrying at its opposite extremity a hand wheel 20. By the rotation of the shaft 19 the rock shaft 13 and its arms 14 are oscillated. This oscillatory movement is transmitted through the links 15 to the vertical shaft 17 of the swivel wheels 3 thereby serving to guide the machine.

Extending rearward on either side of the main carrying wheel 2 is a deck 21 which when the tractor is being used as a corn harvester forms the tilting bottom of the receiving compartment. A central frame or super structure 22 incloses the main carrying wheel 2 as clearly shown in Figs. 2 and 3. There have been shown mounted in the forward structure of the truck or tractor helical packers 23 which are utilized only when the tractor is being employed as a corn harvester. These helical packers serve no purpose in the present structure, but are shown merely as portions in the truck or tractor which is capable of general application. As thus far described the structure is identical with that of the afore-mentioned co-pending applications.

The binder attachment comprises a frame 24 so shaped as to straddle and ride upon the super structure 22 on the main truck or tractor as shown in Fig. 2. Upon this frame 24 is mounted the usual elevator 25 the binding deck 26, packers 27 and sheaf discharging mechanism 28. The particular elevating, binding and discharging mechanism forms no part of the present invention and may be of any desired type. The several moving parts of the mechanism are driven from the sprocket wheel 29 carried upon a longitudinal shaft 30 journaled in the frame of the main truck or tractor. This shaft 30 carries at its forward end a bevel pinion 31 meshing with a corresponding pinion 32 upon the main drive shaft 9. Projecting laterally from the main truck or tractor and coincident with the end of the elevator 25 is the usual platform 33 supported at its outer extremity upon a carrying wheel 34. The platform 33 carries the usual cutter bar 35 and guards 36 and also the traveling apron 37 by which the severed grain is conveyed to the elevator 25. The platform 33 is hinged to the frame 24 of the binder mechanism whereby the platform may oscillate in a vertical plane independent of the carrying truck and main binder mechanism as shown by dotted lines in Fig. 2.

Mounted in suitable bearings in the frame 24 of the binder mechanism immediately below the extremity of the elevator 25 is a revoluble shaft 38 driven by the sprocket chain 39 from the drive sprocket 29. This shaft is concentric with the pivotal support for the platform 33. The shaft 38 carries the roller 40, over which the apron 37 travels. Beneath the shaft 38, the platform 33 is provided with a sill 41 which projects forward of the cutter bar 35 and guards 36 as best shown in Fig. 4. The forward extension of this sill forms the support for the reel post. The reel post 42 is bifurcated at its lower extremity as shown at 43, and is pivotally connected upon trunnions projecting laterally from a sleeve 44 through which the shaft 38 extends. The extension of the sill 41 carries an upright 45 within which a standard 46 is pivoted at 47 in line with the axis of the shaft 38. The standard 46 carries an arcuate notched frame 48 within which the reel post 42 is adjustable to different angular positions about its pivotal connection with the sleeve 44. The reel post 42 is provided with a reciprocatory sleeve 49 having lateral lugs 50 adapted to engage in any one of the series of notches 51 in the arcuate frame 48. At its upper extremity the reel post 42 carries a swiveled T shaped head 52 supporting laterally projecting parallel arms 53. The parallel arms 53 are carried upon a rock shaft 54 extending through the transverse portion of the T shaped swiveled head 52. The reel shaft 55 is journaled in suitable bearings in the parallel arms 53. The rock shaft 54 of the T shaped head 52 is provided with an arm 56 connected by a link 57 with a sliding collar 58 mounted upon the post 42 whereby a reciprocatory movement of said sliding collar will cause the parallel arms 53 to be oscillated thereby raising or lowering the shaft 55 of the reel. To reciprocate the collar 58 there is provided a lever 59 pivoted at 60 upon an arm 61 projecting laterally from the reel post 42. The lever 59 is connected by link 62 with the sliding collar 58 whereby an oscillatory movement of the lever 59 will cause a corresponding adjustment of the arms 53 and the shaft 55. The lateral arm 61 is pivotally attached to the reel post 42 and is provided with a link 63 connecting said arm 61 with the sliding sleeve 49 whereby the elevation of the arm 61 will serve to disconnect the lugs 50 from the notches 51 of the frame 48 thereby permitting the reel post 42 to be adjusted to different angular positions. To actuate the reel there is provided upon the extremity of the shaft 38 a gear pinion 64 meshing with a corresponding gear 65 journaled on one of the trunnions of the sleeve 44. A sprocket wheel 66 is connected with the gear 65 and engages a sprocket chain 67 which in turn engages a corresponding sprocket 68 journaled upon the rock shaft 54 of the head 52. Connected with the sprocket 68 upon the rock shaft 54 is a second sprocket 69 engaging a sprocket chain 70 which in turn drives a sprocket 71 secured upon the reel shaft 55. It is to be noted that the reel post 42 is carried upon the extension of the sill 41 of the platform 33 and is supported independent of the main truck or the main body of the binding mechanism. When in use the standard 46 is rigidly connected with the upright 45 by means of a connecting pin 72 or by any other suitable means, whereby said parts will move in unison. Thus at each elevation of the outer end of the platform 33 as when the carrying wheel 34 thereof passes over an obstruction thereby turning the platform upward the upright and standard 45 and 46 rigidly secured to the sill 41 of the platform oscillate in unison therewith carrying the reel post 42 through such oscillatory movement. In such case the several parts will turn about the shaft 38 as their axis. Through the medium of the intermeshing gears 64 and 65 this oscillatory movement will be accomplished without interfering with the driving connections of the reel. When it is desired to transport the machine the pin 72 is removed or the upright 45 and the standard 46 are otherwise disconnected whereupon the platform 33 may be elevated about its pivotal connection upon the shaft 38 to the position shown by dotted lines in Fig. 5. Upon such elevation of the platform the upright 45 being formed rigid with the extension of the sill 41 of the platform will be oscillated about the pivotal connection 47 to a recumbent position, while the standard 46 and the reel post 42 will remain upright. The reel which is adapted to be folded for transportation comprises two series of radial arms 73 pivotally attached at 74 to lugs 75 projecting radially from heads 76 rigidly secured upon the reel shaft 55. At their outer extremities the radial arms 73 are pivotally attached at 77 to bars or slats 78 extending parallel with the shaft 55. Slidingly mounted on the reel shaft 55 adjacent to the head 76 are disks 79. Rods 80 connect the disks 79 one with the other and project beyond the extremity of the reel shaft 55 where they are connected by a yoke 81. A screw 82 operated by a hand reel 83 engaging the yoke 81 serves to reciprocate the rods 80 and disks 79. The radial arms 73 project inward somewhat beyond their pivotal connections 74 with the lugs 75 of the head 76 and such inward projecting extremities are adapted to be clamped between the sliding disks 79 and the heads 76 to maintain the arms 73 in their extended position. When it is desired to fold the reel the screw is operated to shift the disks 79 away from the head 76 as shown by dotted lines in Fig. 6 whereupon the radial arms 73 may be folded to position substantially parallel with the reel shaft 55 causing the bars 78 to approach each other through a parallel movement as is clearly indicated by dotted lines in Fig. 6. In transporting the machine the reel in addition to being folded to compact form is turned to a position parallel with the direction of travel by withdrawing the pin 84 from the swiveled head 52 of the reel post and turning the said swiveled head 52 about the post 42 to bring the shaft 55 to a fore and aft position.

From the above description it will be apparent that there is thus provided a device of the character described, possessing the particular features of advantage before enumerated as desirable but which obviously is susceptible of modification in its form, proportion, detail construction and arrangement of parts without departing from the principle involved or sacrificing any of its advantages.

While in order to comply with the statute, the invention has been herein described in language more or less specific as to certain structural features, it is to be understood that the invention is not limited to any specific details but that the means and mechanism herein described comprise but one mode of putting the invention into effect and the invention is therefore claimed broadly in any of its possible forms or modifications within the scope of the appended claims.

Having thus described my invention, I claim:

1. In a harvesting machine, a carrying truck having a centrally disposed superstructure; a detachable binder mechanism embodying a saddle shaped frame detachably mounted on and secured to the superstructure of the truck, and a cutter bar and platform projecting laterally from said frame, and operatively connected to the binder mechanism, substantially as specified.

2. A harvesting machine comprising a main frame, an oscillatory platform pivotally connected to the main frame, a cutter bar mounted on the platform, means for operating the cutter bar, a reel, a pivoted supporting post for the reel capable of oscillatory movement in one direction in unison with the platform and in a transverse direction independent of the platform.

3. A harvester comprising a main frame, an oscillatory platform pivotally connected to the main frame, a cutter bar mounted on the platform, means for operating the cutter bar, a reel and a pivotally connected supporting post for the reel, said supporting post and platform being capable of independent oscillatory movement in the same direction and means for interengaging the post and platform whereby they will be caused to oscillate in unison.

4. A harvester comprising a main frame, an oscillatory platform pivotally connected to the main frame, a cutter bar mounted on the platform, means for operating the cutter bar, a reel and a pivotally supported supporting post for the reel, said supporting post being normally connected to and oscillating in unison with the platform and means whereby the platform will be permitted to oscillate independent of the reel post.

5. In a harvesting machine, a main frame embodying grain elevating, binding and discharge mechanism, a cutter bar and platform hinged to said main frame and capable of an independent oscillatory movement with respect thereto, a revoluble reel, a pivotally connected reel post supporting the reel, and means for interlocking the reel post and platform whereby the reel will be caused to oscillate with the platform but permitting the reel post to be disconnected therefrom whereby the platform may be adjusted independent of the reel post, substantially as specified.

6. In a harvesting machine, a main frame embodying grain elevating, binding and discharge mechanism, a cutter bar and platform hinged to said main frame and capable of an independent oscillatory movement with respect thereto, a revoluble reel and a pivotally connected reel post therefor, a jointed support for the reel post one section of which is movable with the platform, the other section being adapted to maintain its relation with the reel post, and means for interlocking the sections, substantially as specified.

7. In a harvesting machine, a main frame embodying grain elevating, binding and discharge mechanism, a cutter bar and platform hinged to said main frame and capable of an independent oscillatory movement with respect thereto, a revoluble drive shaft coincident with the axis of oscillation of the platform, a revoluble reel carried by the platform and driving connections between said reel and the said drive shaft, substantially as specified.

8. In a harvesting machine, a main frame embodying grain elevating, binding and discharge mechanism, a cutter bar and platform hinged to said main frame and capable of an independent oscillatory movement with respect thereto, a drive shaft coincident with the axis of oscillation of the platform, a revoluble reel a reel post pivoted on an axis at right angle to the drive shaft, a gear pinion carried by the drive shaft, a second gear meshing with the first gear and journaled concentric with the pivotal axis of the reel post, and a driving connection between the said gear and the revoluble reel, substantially as specified.

9. In a harvesting machine, a main frame embodying grain elevating, binding and discharge mechanism, a cutter bar and platform hinged to said main frame and capable of an independent oscillatory movement with respect thereto, a drive shaft coincident with the axis of oscillation of the platform, a sleeve journaled on said shaft, a pivotally connected reel post carried by the sleeve, a reel carried by the post and a driving connection between the shaft and reel, substantially as specified.

10. In a harvesting machine, a main frame embodying grain elevating, binding and discharge mechanism, a cutter bar and platform hinged to said main frame and capable of an independent oscillatory movement with respect thereto, a drive shaft coincident with the axis of oscillation of the platform, a sleeve journaled on said shaft and provided with trunnions projecting at right angles to the shaft, a reel post journaled on said trunnions and capable of an oscillatory movement about said shaft as an axis and further capable of oscillatory movement about said trunnions in a direction in line with the shaft, a revoluble reel carried by the post and driving connections between the drive shaft and reel adapted to rotate the reel in various positions of adjustment of the reel post, substantially as specified.

In testimony whereof, I have hereunto set my hand this 29th day of June 1912.

CHARLES B. HAZARD.

Witnesses:
 HARRY F. NOLAN,
 EFFIE B. SHOMO.